(12) United States Patent
Yu et al.

(10) Patent No.: US 8,446,947 B2
(45) Date of Patent: May 21, 2013

(54) METHOD FOR ENCODING A DIGITAL SIGNAL INTO A SCALABLE BITSTREAM; METHOD FOR DECODING A SCALABLE BITSTREAM

(75) Inventors: Rongshan Yu, Singapore (SG); Xiao Lin, Singapore (SG); Susanto Rahardja, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1354 days.

(21) Appl. No.: 10/575,409

(22) PCT Filed: Oct. 6, 2004

(86) PCT No.: PCT/SG2004/000323
§ 371 (c)(1),
(2), (4) Date: Apr. 16, 2007

(87) PCT Pub. No.: WO2005/036528
PCT Pub. Date: Apr. 21, 2005

(65) Prior Publication Data
US 2007/0274383 A1    Nov. 29, 2007

Related U.S. Application Data

(60) Provisional application No. 60/510,629, filed on Oct. 10, 2003.

(51) Int. Cl.
*H04N 7/12*      (2006.01)
*H04N 11/02*     (2006.01)
*H04N 11/04*     (2006.01)
*H03M 7/00*      (2006.01)
*G10H 7/04*      (2006.01)
*G10L 19/00*     (2006.01)

(52) U.S. Cl.
USPC .................. 375/240.03; 704/200.1; 341/50; 84/605

(58) Field of Classification Search
USPC .................................................... 375/240.03
See application file for complete search history.

(56) References Cited

U.S. PATENT DOCUMENTS 5,926,785 A    7/1999    Akamine et al.
(Continued)

FOREIGN PATENT DOCUMENTS
EP    817395    5/2000
(Continued)

OTHER PUBLICATIONS

Jin et al.,"A Heirarchical Lossless/Lossy Coding System for High Quality Audio up to 192 KHZ Sampling 24 Bit Format", IEEE Transactions in Consumer Electronics, vol. 49, No. 3, Aug. 2003. pp. 759-764.

(Continued)

*Primary Examiner* — Christopher S Kelley
*Assistant Examiner* — Hee-Yong Kim
(74) *Attorney, Agent, or Firm* — K. David Crockett, Esq.; Paul J. Backofen, Esq.; Crockett & Crockett, PC

(57) ABSTRACT

A method for encoding a digital signal into a scalable bitstream comprising quantizing the digital signal, and encoding the quantized signal to form a core-layer bitstream, performing an error mapping based on the digital signal and the core-layer bitstream to remove information that has been encoded into the core-layer bitstream, resulting in an error signal, bit-plane coding the error signal based on perceptual information of the digital signal, resulting in an enhancement-layer bitstream, wherein the perceptual information of the digital signal is determined using a perceptual model, and multiplexing the core-layer bitstream and the enhancement-layer bitstream, thereby generating the scalable bitstream. A method for decoding a scalable bitstream into a digital signal comprising de-multiplexing the scalable bitstream into a core-layer bitstream and an enhancement-layer bitstream, decoding and de-quantizing the core-layer bitstream to generate a core-layer signal, bit-plane decoding the enhancement-layer bitstream based on perceptual information of the digital signal, and performing an error mapping based on the bit-plane decoded enhancement-layer bitstream and the de-quantized core-layer signal, resulting in an reconstructed transformed signal, wherein the reconstructed transformed signal is the digital signal.

28 Claims, 7 Drawing Sheets

U.S. PATENT DOCUMENTS

| | | | |
|---|---|---|---|
| 6,092,041 | A | 7/2000 | Pan et al. .................. 704/229 |
| 6,446,037 | B1 | 9/2002 | Fielder et al. ............... 704/229 |
| 2003/0163305 | A1 | 8/2003 | Cheng et al. ................ 704/219 |
| 2003/0171920 | A1 | 9/2003 | Zhou et al. ................. 704/230 |
| 2003/0187634 | A1* | 10/2003 | Li ........................... 704/200.1 |
| 2005/0231396 | A1* | 10/2005 | Dunn ............................ 341/50 |
| 2005/0252361 | A1* | 11/2005 | Oshikiri ......................... 84/605 |

FOREIGN PATENT DOCUMENTS

| | | |
|---|---|---|
| EP | 1160769 | 12/2001 |
| JP | 200358196 A | 2/2003 |
| JP | 2003066998 A | 3/2003 |

OTHER PUBLICATIONS

Geiger et al., "Fine Grain Scalable Perceptual and Lossless Audio Coding Based on INTMDCT", 2003 IEEE Internationa Conference on Acoustics, Speech, and Signal Prosessing. Proceedings, vol. 1 of 6, Apr. 6, 2003. pp. V445-V448.

Weiping Li, "Overview of Fine Granularity Scalability in MPEG-4 Video Standard", IEEE Transactions on Circuits and Systems for Video Technology, vol. 11, No. 3, Mar. 2001.

A. Jin, et al., A Heirarchical Lossless/Lossy Coding System for High Quality Audio up to 192kHz Sampling 24 bit Format,Consumer Electronics, 2003, ICCE, vol. 1, 258-259.

R. Geiger, et al., Fine Grain Scalable Perceptual and Lossless Audio Coding based on IntMDCT, ICASSP 2003, vol. 5, 445-448.

Yu, et al., A Fine Granular Scalable Perceptually Lossy and Lossless Audio Codec, 1 IEEE International Conference 65 (IEEE 2003).

M. Bosi, et al., "ISO/IEC Mpeg-2 Advanced Audio Coding", J. Audio Eng. Soc., vol. 45, No. 10, pp. 789-814, Oct. 1997.

Jr. Stuart, et al., "MLP Lossless Compression," AES 9th Regional Convention Tokyo, 1999.

R. Geiger, J. Herre, J. Koller, and K. Brandenburg, "INTMDCT—A Link Between Perceptual and Lossless Audio Coding," IEEE Proceedings of ICASSP 2002.

J.Li, "Embedded Audio Coding (EAC) with Implicit Auditory Masking", ACM Multimedia 2002, Nice, France, Dec. 2002.

T. Moriya, N. Iwakami, T. Mori, and A. Jin, "A Design of Lossy and Lossless Scalable Audio Coding," IEEE Proceedings of ICASSP 2000.

T. Moriya, et al., "Lossless Scalable Audio Coder and Quality Enhancement," IEEE Proceedings of ICASSP 2002.

M. Hans and R.W. Schafer, "Lossless Compression of Digital Audio," IEEE Signal Processing magazine. vol. 18 No. 4, pp. 21-32, 2001.

Lin Xiao, Li Gang, Li Zhengguo, Chia Thien King, Yoh Ai Ling, "A Novel Prediction Scheme for Lossless Compression of Audio Waveform", IEEE Proceedings of ICME Aug. 2001, Japan.

Shorten: http://www.softsound.com/Shorten.html, 2003.

R. Geiger, T. Sporer, J. Koller, and K. Brandenburg, "Audio Coding based on Integer Transforms," 111th AES Convention, Sep. 2001.

J. Johnston, "Estimation of Perceptual Entropy," IEEE Proceedings of ICASSP 1988.

R.Yu, C. C. Ko, X. Lin and S. Rahardja, "Bit-plane Golomb Code for Sources with Laplacian Distributions," IEEE Proceedings of ICASSP 2003.

Monkey's Audio, http://www.monkeysaudio.com, Jan. 2001.

S. H. Park, et al., "Multi-Layer Bit-Sliced Bit Rate Scalable MPEG-4 Audio Coder", presented at the 103th Convention of the AES, New York, Sep. 1997 (preprint 4520).

Ralf Geiger, et al., "Fine Grain Scalable Perceptual and Lossless Audio Coding Based on INTMDCT," IEEE Proceedings of ICASSP 2003.

"ISO/IEC CD 14496-3 Subpart 4; Information Technology—Coding of Audiovisual Objects; Part 3. Audio; Subpart 4 Time/Frequency Coding," ISO/JTC 1/SC 29/WG11, //ISO/JTC 1/SC 29 N2203TF, May 15, 1998.

T. Painter, A. Spanias, "Perceptual Coding of Digital Audio", IEEE Proceedings, vol. 88, No. 4, Apr. 2000.

ISO/IEC 11172-3, "Coding of Moving Pictures and Associated Audio for Digital Storage Media at up to about 1.5 MBIT/ s, Part 3 Audio" SC29/WG11, Nov. 22, 1991.

Westen, S.J.P., R.L. Lagendijk, and J. Biemond, "Optimization of JPEG Color Image Coding Using a Human Visual System Model", SPIE conference on Human Vision and Electronic Imaging, 1996.

Westen, S.J.P., R.L. Lagendijk, and J. Biemond, "SpatioTemporal Model of Human Vision For Digital Video Compression," SPIE Proceeding of Electronic Imaging, 1997.

J. Li and S. Lie, "An Embedded Still Image Coder with Rate-Distortion Optimization," IEEE Trans. On Image Processing, vol. 8, No. 7, pp. 913-924, Jul. 1999.

* cited by examiner

METHOD FOR ENCODING A DIGITAL SIGNAL INTO A SCALABLE BITSTREAM; METHOD FOR DECODING A SCALABLE BITSTREAM

BACKGROUND OF THE INVENTION

Recently, with the advances in computers, networking and communications streaming audio contents over networks such as the Internet, wireless local area networks, home networks and commercial cellular phone systems is becoming a mainstream means of audio service delivery. It is believed that with the progress of the broadband network infrastructures, including xDSL, fiber optics, and broadband wireless access, bit rates for these channels are quickly approaching those for delivering high sampling-rate, high amplitude resolution (e.g. 96 kHz, 24 bit/sample) lossless audio signals. On the other hand, there are still application areas where high-compression digital audio formats, such as MPEG-4 AAC (described in [1]) are required. As a result, interoperable solutions that bridge the current channels and the rapidly emerging broadband channels are highly demanded. In addition, even when broadband channels are widely available and the bandwidth constraint is ultimately removed, a bit-rate-scalable coding system that is capable to produce a hierarchical bit-stream whose bit-rates can be dynamically changed during transmission is still highly favorable. For example, for applications where packet loss occurs occasionally due to accidents or resource sharing requirements, the current broadband waveform representations such as PCM (Pulse Code Modulation) and lossless coding formats may suffer serious distortions in a streaming situation. However, this problem can be solved if one could set packet priorities in the case that network resources are dynamically changing. Finally, a bit-rate-scalable coding system also provides the server advantageous for audio streaming services, where graceful QoS degradation could be achieved if an excessive number of demands from client sites come.

Previously many lossless audio coding algorithms have been proposed (see [2]-[8]). Most approaches rely on a prediction filter to remove the redundancy of the original audio signals while the residuals are entropy coded (as described in [5]-[12]). Due to the existence of the predictive filters, the bit-streams generated by these prediction based approaches are difficult and not efficient (see [5],[6]), if not impossible, to be scaled to achieve bit-rate scalability. Other approaches, such as described in [3], build the lossless audio coder through a two layer approach where the original audio signals are first coded with a lossy encoder and its residual is then lossless coded with a residual encoder. Although this two layer design provides some sort of bit-rate scalability, its granularity is too coarse to be appreciated by audio streaming applications. Audio codecs that provide the fine grain scalability on bit-rate were previously proposed in [4] and [18], however, unlike the system to be discussed here, those codecs don't provide the backward compatibility that the lossy bit-streams produced by both codecs are incompatible to any existing audio codec.

In [21], [22], [23] perceptual models are described.

The object of the invention is to provide a method for encoding a digital signal in a scalable bitstream wherein backward compatibility can be maintained.

SUMMARY OF THE INVENTION

A method for encoding a digital signal into a scalable bitstream is provided, which method comprises: quantizing the digital signal, and encoding the quantized signal to form a core-layer bitstream; performing an error mapping based on the digital signal and the core-layer bitstream to remove information that has been encoded into the core-layer bitstream, resulting in an error signal; bit-plane coding the error signal based on perceptual information of the digital signal, resulting in an enhancement-layer bitstream, wherein the perceptual information of the digital signal is determined using a perceptual model; and multiplexing the core-layer bitstream and the enhancement-layer bitstream, thereby generating the scalable bitstream.

Further, an encoder for encoding a digital signal into a scalable bitstream, a computer readable medium, a computer program element, a method for decoding a scalable bitstream into a digital signal, a decoder for decoding a scalable bitstream into a digital signal, a further computer readable medium and a further computer program element according to the method described above are provided.

In one embodiment, a lossless audio codec that achieves fine grain bit-rate scalability (FGBS) with the following characteristics is presented:

Backward compatibility: a high-compression core-layer bit-stream, such as MPEG-4 AAC bitstream, is embedded in the lossless bit-stream.

Perceptually embedded lossless bit-stream: the lossless bit-stream can be truncated to any lossy rates without loss in the perceptual optimality in the reconstructed audio.

Low complexity: it adds only very limited calculation upon AAC (binary arithmetic codec) as well as very limited memory.

The abundant functionality provided by the presented audio codec suggests its capability of serving as a "universal" audio format to meet the various rate/quality requirements for different audio streaming or storage applications. For example, a compliant MPEG-4 AAC bit-stream which is used as the core-layer bitstream can be easily extracted from the bit-stream generated using the codec for conventional MPEG-4 AAC audio services. On the other hand, lossless compression is also provided by the codec for audio editing or storage applications with lossless reconstruction requirement. In audio streaming applications, where the FGBS is needed, the lossless bit-stream of the codec can be further truncated to lower bit-rates at the encoder/decoder or in the communication channel for any rate/fidelity/complexity constraints that may be arisen in practical systems.

In one embodiment a method for encoding a digital signal to form a scalable bitstream is provided, wherein the scalable bitstream can be truncated at any point to produce a lower quality (lossy) signal when decoded by a decoder. The method can be used for encoding any types of digital signal, such as audio, image or video signals. The digital signal, which corresponds to a physical measured signal, may be generated by scanning at least a characteristic feature of a corresponding analog signal (for example, the luminance and chrominance values of a video signal, the amplitude of an analog sound signal, or the analog sensing signal from a sensor). For example, a microphone may be used to capture an analog audio signal, which is then converted to a digital audio signal by sampling and quantizing the captured analog audio signal. A video camera may be used to capture an analog video signal, which is then converted to a digital video signal using a suitable analog-to-digital converter. Alternatively, a digital camera may be used to directly capture image or video signal onto an image sensor (CMOS or CCD) as digital signals.

The digital signal is quantized and coded to form a core-layer bitstream. The core-layer bitstream forms the minimum bit-rate/quality of the scalable bitstream.

An enhancement-layer bitstream is used to provide an additional bit-rate/quality of the scalable bitstream. The enhancement-layer bitstream is formed according to the invention by performing an error mapping based on the transformed signal and the core-layer bitstream to generate an error signal. The purpose of performing error mapping is to remove the information which has already been coded into the core-layer bitstream.

The error signal is bit-plane coded to form the enhancement-layer bitstream. The bit-plane coding of the error signal is performed based on perceptual information, i.e. the perceived or perceptual importance, of the digital signal. Perceptual information used in this present invention refers to information which is related to the human sensory system, for example the human visual system (i.e. the human eye) and the human auditory system (i.e. the human ear). Such perceptual information for the digital signal (video or audio) is obtained using a perceptual model, for example the Psychoacoustic Model I or II in the MPEG-1 audio (described in [21]), for audio signals, and the Human Visual System Model for image (described in [22]), and the Spatio-Temporal Model used in video (described in [23]).

The psychoacoustic model is based on the effect that the human ear is only able to pick up sounds within a certain band of frequencies depending on various environmental conditions. Similarly, the HVM (human visual model) is based on the effect that the human eye is more attentive to certain motion, colors and contrast.

The core-layer bitstream and the enhancement-layer bitstream are multiplexed to form the scalable bitstream.

The scalable bitstream can be decoded to losslessly reconstruct the digital signal. As mentioned above, the core-layer bitstream is an embedded bitstream which forms the minimum bit-rate/quality of the scalable bitstream, and the enhancement-layer bitstream forms the lossy to lossless portion of the scalable bitstream. As the enhancement-layer bitstream is perceptually bit-plane coded, the enhancement-layer bitstream can be truncated, in a manner such that data in the enhancement-layer bitstream which are less perceptually important are truncated first, to provide perceptual scalability of the scalable bitstream. In other words, the scalable bitstream can be scaled by truncating the enhancement-layer bitstream, so that the enhancement-layer bitstream, and hence the scalable bit-stream, can be perceptually optimized even when truncated to a lower bit-rate/quality.

The method according to the invention can be used as a lossless encoder for digital signal, such as image, video or audio signal, in high bandwidth or hi-fidelity systems. When the bandwidth requirement changes, the bit-rate of the bitstream generated by the encoder may be changed accordingly to meet the change in bandwidth requirements. Such a method can be implemented in many applications and systems such as MEG audio, image and video compression of JPEG 2000.

According to an embodiment of the invention, the digital signal is transformed into a suitable domain before being quantized to form the quantized signal. The digital signal may be transformed within the same domain, or from one domain to another domain in order to better represent the digital signal, and thereby to allow an easy and efficient quantizing and coding of the digital signal to form the core-layer bitstream. Such domain may include, but not limited to, the time domain, the frequency domain, and a hybrid of the time and frequency domains. The transformation of the digital signal may even be carried out by a unitary matrix, I.

In one embodiment, the digital signal is transformed to a transformed signal using an integer Modified Discrete Cosine Transform (intMDCT). The intMDCT is a reversible approximation to the Modified Discrete Cosine Transform (MDCT) filterbank, which is commonly used in a MPEG-4 AAC coder. Other transforms for transforming the digital signal into a suitable domain for further processing can also be used, including, but not limited to, Discrete Cosine Transform, Discrete Sine Transform, Fast Fourier Transform and Discrete Wavelet Transform.

When intMDCT is used to transform the digital signal to the transformed signal, the transformed signal (specifically the intMDCT coefficients which describes the transformed signal) is preferably normalized or scaled to approximate the output of a MDCT filterbank. The normalizing of the intMDCT-transformed signal may be useful in the case when a quantizer for quantizing the transformed signal, for example an AAC quantizer, has MDCT filterbank with a global gain different from the global gain of the intMDCT filterbank. Such normalizing process approximates the intMDCT-transformed signal to the MDCT filterbank so that it is suitable to be directly quantized and coded by the quantizer to form the core-layer bitstream.

For encoding an audio digital signal, the digital/transformed signal is preferably quantized and coded according to the MPEG AAC specification to generate the core-layer bitstream. This is because AAC is one of the most efficient perceptual audio coding algorithm for generating a low bit-rate but high quality audio bitstream. Therefore, the core-layer bitstream generated using AAC (referred as AAC bitstream) has a low bit-rate, and even when the scalable bitstream is truncated to the core-layer bitstream, the perceptual quality of the truncated bitstream is still high. It should be noted that other quantization and coding algorithms/methods, for example MPEG-1 Audio Layer 3, (MP3) or other proprietary coding/quantizing methods for generating the core-layer bitstream can also be used.

The error mapping which removes information which has already been coded into the core-layer bitstream and which generates a residual signal (or error signal) is performed by subtracting the lower quantization threshold (closer to zero) of each quantized value of the quantized signal from the transformed signal. Such error mapping procedure based on quantization threshold has the advantage that the values of the residual signal is always positive, and the amplitude of the residual signal is independent of the quantization threshold. This allows a low-complexity and efficient embedded coding scheme to be implemented. It is however also possible to subtract a reconstructed transformed signal from the transformed signal to generate the residual signal.

To determine the perceptual information of the digital signal for bit-plane coding of the error signal, the psychoacoustic model can be used as the perceptual model. The psychoacoustic model may be based on Psychoacoustic Model I or II used in MPEG-1 audio (as described in [21]), or the Psychoacoustic Model in MPEG-4 audio (as described in [19]). When a perceptual quantizer, such as the one used according to AAC, is used for quantizing and coding the digital/transformed signal, the perceptual model used in the perceptual quantizer may also be used to determine the perceptual information for bit-plane coding of the error signal. In other words, a separate perceptual model is not needed in this case to provide the perceptual information for bit-plane coding of the error signal.

The perceptual information for bit-plane coding of the error signal is preferably also multiplexed with the core-layer and enhancement-layer bitstreams to form the scalable bitstream as side information. The side information can be used to reconstruct the error signal by a decoder.

The error signal is arranged in a plurality of bit-planes, with each bit-plane having a plurality of bit-plane symbols.

In an embodiment of the invention, the arrangement or order of the bit-planes of the error signal is changed or shifted, and the bit-planes are subsequently scanned and coded in a consecutive sequential manner. The bit-planes are shifted in a way such that when the bit-plane coding is performed on the shifted bit-planes, bit-planes comprising the more perceptually important bit-plane symbols are scanned and coded first. In this embodiment, all the bit-plane symbols in a bit-plane are coded before coding the bit-plane symbols of a subsequent adjacent bit-plane.

In another embodiment of the invention, the bit-plane symbols of the bit-planes are scanned and coded in a sequence based on the perceptual information. In other words, not all the bit-plane symbols in a bit-plane are coded before coding the bit-plane symbols from another bit-plane. The scanning and coding sequence of the bit-plane symbols from the plurality of bit-planes is determined based on the perceptual information such that bit-plane symbols which are more perceptually important are coded first.

The perceptual information of the digital signal determined by the perceptual model may include the first (or maximum) bit-plane $M(s)$ (i.e. a number (index) specifying the first bit-plane) of the plurality of bit-planes for the bit-plane coding of the error signal, and/or the Just Noticeable Distortion (JND) level of the digital signal. It should be noted that the perceptual information relates to the digital signal for every different domain characteristics (for example frequency, time, signal amplitude, etc) or a range of domain characteristics. For example, when the digital signal is transformed to the frequency domain, the perceptual information of the digital signal at every frequency or in a band of frequency (frequency band s, or more generally, domain band s) values may be different, indicating that the signal may be more important perceptually at certain frequencies.

In an embodiment of the invention, perceptual significance $P(s)$ of the digital signal, corresponding to each frequency band s, is determined as the perceptual information. In this embodiment, the JND level $\tau(s)$ of the digital signal corresponding to the bit-plane of the error signal is determined. The bit-plane corresponding to the JND level $\tau(s)$ is then subtracted from the index of the first bit-plane of the plurality of bit-planes for the bit-plane coding of the error signal $M(s)$ to result in the perceptual significance $P(s)$. The perceptual significance $P(s)$ can be used for controlling the shifting of the bit-planes, so that bit-planes comprising the more perceptually important bit-plane symbols are scanned and coded first. More advantageously, the perceptual significance $P(s)$ can be used to control the scanning and coding sequence of the bit-plane symbols from the plurality of bit-planes so that bit-plane symbols which are more perceptually important are coded first.

In a further embodiment of the invention, the perceptual significance $P(s)$ is normalized to form a normalized perceptual significance $Ps'(s)$. In this embodiment, a common perceptual significance $Ps\_common$ of the digital signal is defined based on a function of the perceptual significance $Ps(s)$. Examples of such function of the perceptual significance $Ps(s)$ include the average value, the maximum value, the minimum value or a normalized value of the perceptual significance $Ps(s)$. The common perceptual significance $Ps\_common$ is subtracted from the perceptual significance $Ps(s)$ to result in the normalized perceptual significance $Ps'(s)$ for each frequency band s. When the frequency band s contains at least one non-zero value quantized signal, the frequency band s is a significant band.

Otherwise, the frequency band s is an insignificant band s. For significant band, the value of the corresponding perceptual significance $Ps(s)$ is set to the value of the common perceptual significance $Ps\_common$. For insignificant band, the corresponding normalized perceptual significance $Ps'(s)$ is multiplexed with the core-layer bitstream and the enhancement-layer bitstream for generating the scalable bitstream for transmission. This normalized perceptual significance $Ps'(s)$ is transmitted in the scalable bitstream as side information for decoding the scalable bitstream in a decoder.

The normalizing of the perceptual significance $Ps(s)$ by defining a common perceptual significance $Ps\_common$ has the advantage of reducing the amount of perceptual information to be transmitted in the scalable bitstream by utilizing information obtained when quantizing the digital/transformed signal to generate the core-layer bitstream. Therefore, perceptual information, in particular the normalized perceptual significance $Ps'(s)$, is only needed to be transmitted to the decoder side for insignificant band, as such perceptual information for significant band can be easily regenerated by the decoder.

The index of the first (or maximum) bit-plane of the plurality of bit-planes for the bit-plane coding of the error signal $M(s)$, which is part of the perceptual information of the digital signal, can be determined from the maximum quantization interval used for quantizing the digital/transformed signal. For significant band, the maximum quantization interval (the difference between the higher and lower quantization threshold corresponding to each quantized value of the quantized signal) is determined, and the said first bit-plane (specified by $M(s)$) is determined accordingly. Such maximum quantization interval can also be determined at the decoder side, and hence, the said first bit-plane (specified by $M(s)$) need not be transmitted as part of the scalable bitstream in this case (for significant band).

Although the encoding of a digital signal into a scalable bitstream is described, it shall also be understood that the invention also includes the decoding of the scalable bitstream into a decoded digital signal by the reverse of the method as described above.

In one embodiment of the invention, a method for decoding the scalable bitstream into the digital signal is provided which includes de-multiplexing the scalable bitstream into a core-layer bitstream and an enhancement-layer bitstream, decoding and de-quantizing the core-layer bitstream to generate a core-layer signal, bit-plane decoding the enhancement-layer based on perceptual information of the digital signal, performing an error mapping based on the bit-plane decoded enhancement-layer signal and the de-quantized core-layer signal to generate an reconstructed transformed signal, wherein the reconstructed transformed signal is the digital signal. It should be noted that the method for decoding the scalable bitstream may be used in combination with but also separately from the method for encoding a digital signal into the scalable bitstream as described above.

The reconstructed transformed signal may be transformed to generate the digital signal, if the digital signal is in a domain different from the reconstructed transformed signal.

The exact implementation of the decoding of the scalable bitstream to generate the digital signal depends on how the scalable bitstream is encoded by the encoder. In one example, the reconstructed transformed signal may be transformed using intMDCT to generate the digital signal. The core-layer bitstream may be decoded and de-quantized according to the MPEG AAC specification. The error mapping is performed by adding the lower quantization threshold used for de-quantizing the transformed signal and the bit-plane decoded enhancement-layer bitstream to generate the reconstructed transformed signal. The advantages and other implementations of the decoder are similar to the encoder, which has already been described above.

The perceptual information of the digital signal may be obtained by de-multiplexing the scalable bit-stream, if the perceptual information has been multiplexed into the scalable bitstream as side information. Alternatively, if the core-layer bitstream is perceptually encoded, the perceptual information obtained by decoding and de-quantizing the core-layer bitstream may be used for bit-plane decoding of the enhancement-layer bitstream.

In an embodiment of the invention, the enhancement-layer bitstream is bit-plane decoded in a consecutive sequence to generate a plurality of bit-planes comprising a plurality of bit-plane symbols, and the bit-planes are shifted based on the perceptual information of the digital signal to generate the bit-plane decoded enhancement-layer bitstream.

In another embodiment of the invention, the enhancement-layer bitstream is bit-plane decoded in a sequence based on the perceptual information of the digital signal to generate a plurality of bit-planes comprising a plurality of bit-plane symbols, thereby generating the bit-plane decoded enhancement-layer bitstream.

The perceptual information of the digital signal may be at least one of the following:
   the bit-plane which corresponds to the enhancement-layer bitstream when the bit-plane decoding of the enhancement-layer bitstream starts M(s); and
   the Just Noticeable Distortion (JND) level of the digital signal, wherein s corresponds to a frequency band of the digital signal.

The bit-plane which corresponds to the enhancement-layer bitstream when the bit-plane decoding of the enhancement-layer bitstream starts M(s) is determined from the maximum quantization interval used for de-quantizing the core-layer bitstream.

The second aspect of the invention not only relates to a method for decoding a scalable bitstream into a digital signal, but also includes a computer program, a computer readable medium and a device for implementing the said method.

DETAILED DESCRIPTION OF THE INVENTION

Various embodiments and implementations of the invention shall now be described in detail with reference to the figures, wherein:

FIG. 1 shows an encoder 100 according to an embodiment of the invention.

Figure 1:
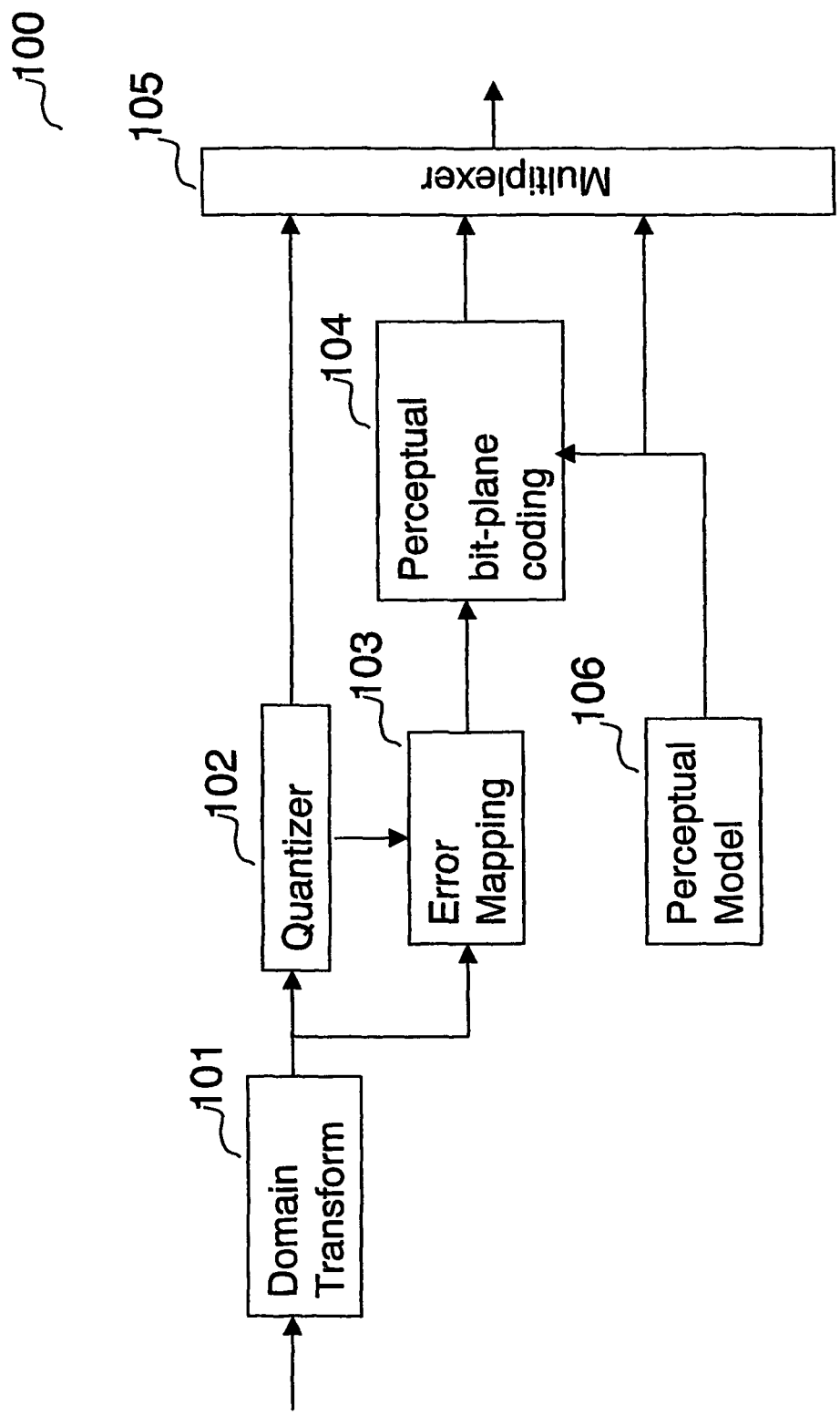
FIG. 1 shows an encoder according to an embodiment of the invention.

The encoder 100 serves for generating a scalable bitstream, and comprises two distinct layers, namely, a core-layer which generates the core-layer bit-stream, and a Lossless Enhancement (LLE) layer which generates the enhancement-layer bitstream.

The encoder comprises a domain transformer 101, a quantizer 102, an error mapping unit 103, a perceptual bit-plane coder 104 and a multiplexer 105.

In the encoder 100, the digital signal is first transformed by the domain transformer 101 to a suitable domain, such as frequency domain, resulting in a transformed signal. The coefficients of the transformed signal are quantized by the quantizer 102 and coded to generate the core-layer bitstream. Error-mapping is performed by the error mapping unit 103, which corresponds to the LLE layer, to remove the information from the coefficients of the transformed signal that has been used or coded in the core layer to form the core-layer bitstream. The resultant residual or error signal, specifically error coefficients, are bit-plane coded by the bit plane coder 104 to generate the embedded LLE bitstream. This embedded bit-stream can be further truncated to lower bit-rates at the encoder 100 or at a corresponding decoder (as the decoder 200 shown in FIG. 2 and described below), or in the communication channel to meet the rate/fidelity requirements. A perceptual model 106 is used to control the bit-plane coding of the error coefficients, so that the bits of the error coefficients which are more perceptually significant are coded first.

Finally, the resultant LLE layer bitstream is multiplexed with the core layer bitstream by the multiplexer 105 to generate the scalable bitstream. In addition, perceptual information for controlling the bit-plane coding of the error coefficients may also transmitted as a side information so that a corresponding bit-plane decoder is able to reconstruct the error coefficients in a correct order.

When the LLE bit-stream is truncated to lower rates, the decoded signal would be a lossy version of the original input signal.

Figure 2:
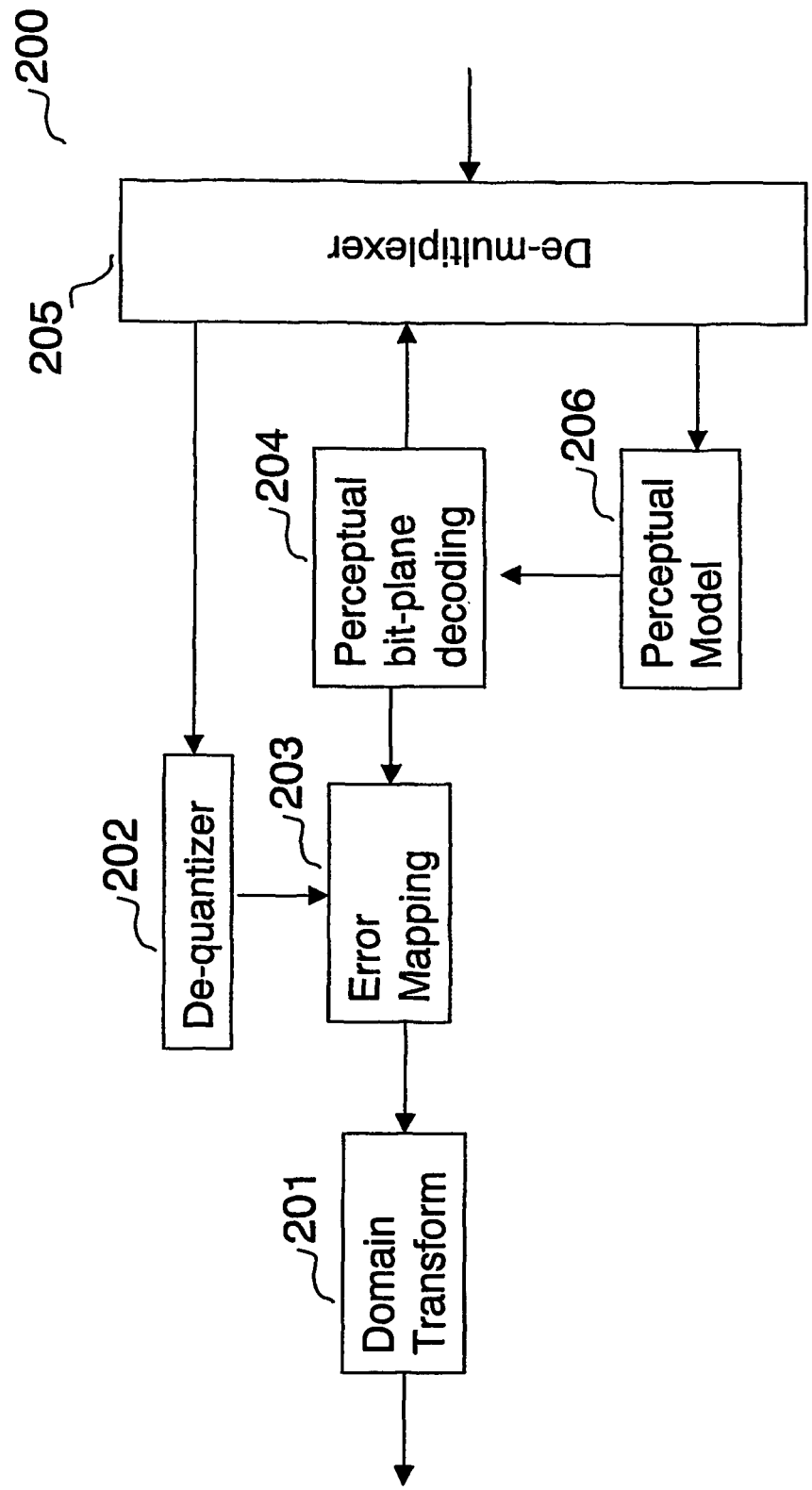
FIG. 2 shows a decoder according to an embodiment of the invention.

FIG. 2 shows a decoder 200 according to an embodiment of the invention.

The decoder 200 decodes a scalable bitstream generated by the encoder 100 to reconstruct the digital signal which was encoded by the encoder 100.

The decoder 200 comprises a domain transformer 201, a de-quantizer 202, an error mapping unit 203, a perceptual bit-plane decoder 204 and a de-multiplexer 205.

The de-multiplexer 205 receives the scalable bitstream as input and splits the scalable bitstream into the core-layer bitstream and the enhancement-layer bitstream as generated by the encoder 100. The core-layer bitstream is decoded and de-quantized by the de-quantizer 202 to form the core-layer signal. The enhancement-layer bitstream is perceptually bit-plane decoded based on the perceptual information given by a perceptual model 206 by the perceptual bit-plane decoder 204, and is subsequently error mapped by the error mapping unit 203 with the core-layer signal to generate an enhancement-layer signal. The enhancement-layer signal is finally transformed back to the domain of the digital signal by the domain transformer 201, resulting in an enhancement-layer transformed signal which is the reconstructed digital signal.

The processing carried out by the encoder 100 and the decoder 200 is explained in detail in the following.

The input signal is normally transformed to the frequency domain by the domain transformer 101 before it is quantized by the quantizer 102 (which is part of the core-layer encoder) to generate the core-layer bitstream. Various transform functions may be used for transforming the input signal to the frequency domain, such as Discrete Cosine Transform (DCT), Modified Discrete Cosine Transform (MDCT), integer MDCT (IntMDCT) or Fast Fourier Transform (FFT).

When MPEG-4 AAC encoder is used as the core-layer encoder (for audio signal), MDCT is commonly used to transform the input audio signal to the frequency domain, as described in [1]. In [13], integer MDCT (IntMDCT) is proposed as a revertible approximation to the Modified Discrete Cosine Transform (MDCT) filterbank used with the MPEG-4 AAC encoder. A generally used way to implement the IntMDCT is to factorize the MDCT filterbank into a cascade of Givens rotations in the form of:

$$\begin{pmatrix} \cos\alpha & -\sin\alpha \\ \sin\alpha & \cos\alpha \end{pmatrix},$$

which is further factorized into three lifting steps $$\begin{pmatrix} \cos\alpha & -\sin\alpha \\ \sin\alpha & \cos\alpha \end{pmatrix} = \begin{pmatrix} 1 & \frac{\cos\alpha - 1}{\sin\alpha} \\ 0 & 1 \end{pmatrix} \begin{pmatrix} 1 & 0 \\ \sin\alpha & 1 \end{pmatrix} \begin{pmatrix} 1 & \frac{\cos\alpha - 1}{\sin\alpha} \\ 0 & 1 \end{pmatrix}.$$

Each lifting step can be approximated by a revertible integer to integer mapping with the rounding to the nearest integer operation $r:R \to Z$. For example, the last lifting step is approximated by:

$$(x_1, x_2) \to \left(x_1 + r\left(\frac{\cos\alpha - 1}{\sin\alpha} x_2\right), x_2\right),$$

which can be losslessly reverted by:

$$(x'_1, x'_2) \to \left(x'_1 - r\left(\frac{\cos\alpha - 1}{\sin\alpha} x'_2\right), x'_2\right).$$

IntMDCT is thus obtained by implementing all the Givens rotations with the revertible integer mapping as described above.

In the decoder, intMDCT can again be used by the domain transformer 201 to transform the enhancement-layer signal to the (reconstructed) digital signal.

At the core layer, the coefficients c(k) of the transformed signal, where k=1, . . . , 1024 is the length of a frame of the core-layer bitstream, are quantized by the quantizer 102 and coded into the core-layer bitstream. In the context of an input audio signal, the transformed signal coefficients may be quantized according to the quantization values of a MPEG-4 ACC coder, a MPEG-1 Layer 3 Audio (MP3) coder or any proprietary audio coder.

When the MPEG-4 ACC coder is used in conjunction with the IntMDCT, the transformed signal coefficients (also known as the IntMDCT coefficients), c(k), are first normalized as $$c'(k) = \alpha \cdot c(k)$$

to approximate the normalized outputs to the outputs of the MDCT filterbank. The normalized IntMDCT coefficients, c'(k), are then quantized and coded, for example, according to an AAC quantizer (see [19]) which is given as follows:

$$i(k) = \text{sgn}[c'(k)] \left\lfloor \left(\frac{|c'(k)|}{\sqrt[4]{2^{\text{scale\_factor}(s)}}}\right)^{3/4} + 0.4054 \right\rfloor.$$

Here $\lfloor \cdot \rfloor$ denotes the flooring operation which truncates a floating operand to integer, i(k) is the AAC quantized coefficients and scale_factor(s) is a scale factor of a scale-factor band s in which the coefficient c(k) belongs to. The scale factors can be adjusted adaptively by a noise shaping procedure so that the quantization noise is best masked by the masking threshold of the human auditory system. A widely adopted approach for this noise shaping procedure is the nested quantization and coding loop as described in details in [1].

The quantized coefficients i(k) are noiselessly coded (in this example by the quantizer 102), for example, using Huffman code or Bit-Sliced Arithmetic Code (BSAC) as described in [17]. BSAC is preferred if bit-rate scalability is further required in the core layer bitstream. The scale factors are differentially encoded, for example, by the DPCM encoding process described in [1], or using Huffman code. The core-layer bitstream can then be generated by multiplexing all the coded information according to the AAC bitstream syntax.

A more comprehensive description on MPEG AAC can be found in [1] or in the International standard document on MPEG AAC [19].

It should be noted that although the mechanism of embedding the MPEG-4 AAC compliant bit-stream is described, it is also possible to use bitstreams which are compliant to other coders such as MPEG 1/2 Layer I, II, III (MP3), Dolby AC3, or SONY's ATRAC proprietary encoders as described in [20].

When quantizer 102 works according to the MPEG AAC coder, the de-quantizer 202 preferably works according to a MPEG AAC decoder for decoding and de-quantizing the core-layer bit-stream in the decoder 200. Specifically, the de-quantizer 202 is used to generate the core-layer signal which is subsequently used for error mapping by the error mapping unit 203 in the decoder 200 to generate the enhancement-layer signal as will be described below.

However, it should be noted that de-quantizers according to other specifications such as MP3 or other proprietary decoders may be used in the decoder 200.

In the LLE layer, an error mapping procedure is employed to remove the information that has already been coded in the core-layer bit-stream. A possible approach to build such an error mapping procedure is by subtracting the lower (closer to zero) quantization threshold of each quantized coefficient from the corresponding transformed input signal coefficient. This can be illustrated as:

$$e(k) = c(k) - thr(k),$$

where the thr(k) is the lower (closer to zero) quantization threshold for c(k), and e(k) is the error coefficient which represents the error signal.

When the MPEG-4 AAC coder is used as the quantizer:

$$thr(k) = \text{sgn}[c(k)] \left\lfloor \frac{\sqrt[4]{2^{\text{scale\_factor}(s)}} [i(k) - 0.4054]^{4/3}}{\alpha} \right\rfloor$$

In practical applications, to ensure robust reconstruction, a mapping from integer i(k) to integer thr (k) may be performed using a lookup table. As can be clearly seen from the above formula, a total of 4 tables are required for different values of scale_factors (as the same table can be shared among different values scale_factors if they have a modulus 4 by bit-shifting), wherein each table contains the mapping between all possible values of i(k) and corresponding thr(k) for any scale_factor from the set of those with modulus 4.

It is also possible to perform the error mapping procedure by subtracting a reconstructed coefficient of the transformed input signal coefficient from the transformed signal coefficient as described in [3], which can be illustrated as:

$$e(k)=c(k)-\hat{c}(k)$$

wherein ĉ(k) is the reconstructed transformed signal coefficient.

In general, it is also possible to perform the error mapping procedure based using:

$$e(k)=c(k)-f(k)$$

wherein f(k) is any function which corresponds to c(k), such as $$f(k) = \frac{1}{2}(thr(k+1) - thr(k)).$$

Clearly, for c (k) that has already been significant in the core layer (thr(k)≠0), the sign of the IntMDCT residual e(k) can be determined from the core layer reconstruction and hence only its amplitude is needed to be coded in the LLE layer. In addition, it is well known that for most audio signals, c(k) can be approximated by Laplacian random variables with the probability density function (pdf):

$$f(c(k)) = e^{-|c(k)|\sqrt{2/\sigma^2}} / 2\sigma^2,$$

where σ is the variance of c(k). From the "memoryless" property of a Laplacian pdf it is easy to verify that the amplitude of e(k) is geometrically distributed as, $$f(|e(k)|) = \beta \cdot \theta(k)^{|e(k)|}, \quad (1)$$

where the distribution parameter θ(k) is determined by the variance of c(k) and the step size of the core layer quantizer. This property enables a very efficient bit-plane coding scheme, such as the bit-plane Golomb code (BPGC) 0 for encoding the error signal to be applied.

In the decoder 200, the coefficients of the transformed signal may be reconstructed by the error mapping procedure performed by the error mapping unit 203 according to the following equation:

$$c(k)=e'(k)+thr(k)$$

wherein e'(k) are the decoded error coefficients which describe the bit-plane decoded enhancement-layer bitstream, which corresponds to the error coefficients e(k) in the encoder 100. Hence it can be seen that with the transformed signal coefficients c(k) can be regenerated from the decoded error coefficients e'(k) (possible a lossy version if the LLE bitstream is truncated to lower rates) and the quantization threshold thr(k) generated in the same manner in the encoder with the quantization index i(k) contained in the embedded core-layer (AAC) bitstream.

Similar to the encoder 100, the transformed signal coefficients c(k) in the decoder 200 may also be generated using (adding) the decoded error coefficients e'(k) and reconstructed coefficients of the core-layer bitstream. Also, the transformed signal coefficients c(k) may be generated using (adding) the decoded error coefficients e'(k) and a function of c(k).

To produce the scalable to lossless portion of the final embedded lossless bit-stream, the residual or error signal is further coded by the perceptual bit-plane coder 104 using bit-plane coding, an embedded coding technology that has widely adopted in audio coding [3] or image coding [5], in the LLE layer.

A description of a general bit-plane coding procedure can be found in [4] and [15]. Consider an input n-dimensional data vector $\underline{x}_n = \{x_1, \ldots, x_n\}$ where $x_i$ is extracted from some random sources of some alphabet $A \subset \Re$. Clearly, $x_i$ can be represented in a binary format $$x_i = (2s_i - 1) \cdot \sum_{j=\infty}^{-\infty} b_{i,j} \cdot 2^j, \quad i = 1, \ldots, k$$

by cascading of binary bit-plane symbols that comprises of a sign symbol $$s_i \triangleq \begin{cases} 1 & x_i \geq 0 \\ 0 & x_i < 0 \end{cases},$$

and amplitude symbols $b_{i,j} \in \{0, 1\}$. In practice, the bit-plane coding could be started from the maximum bit-plane M of vector $\underline{x}_n$ where M is an integer that satisfies $$2^{M-1} \leq \max\{|x_i|\} < 2^M, \quad i=1, \ldots, k,$$

and stopped at bit-plane 0 if $\underline{x}_n$ is a integer vector.

The bit-plane coding and decoding process according to one embodiment of the invention and as for example performed by the perceptual bit-plane coder 104 and the perceptual bit-plane decoder 204 is explained in the following with reference to FIG. 3.

Figure 3:
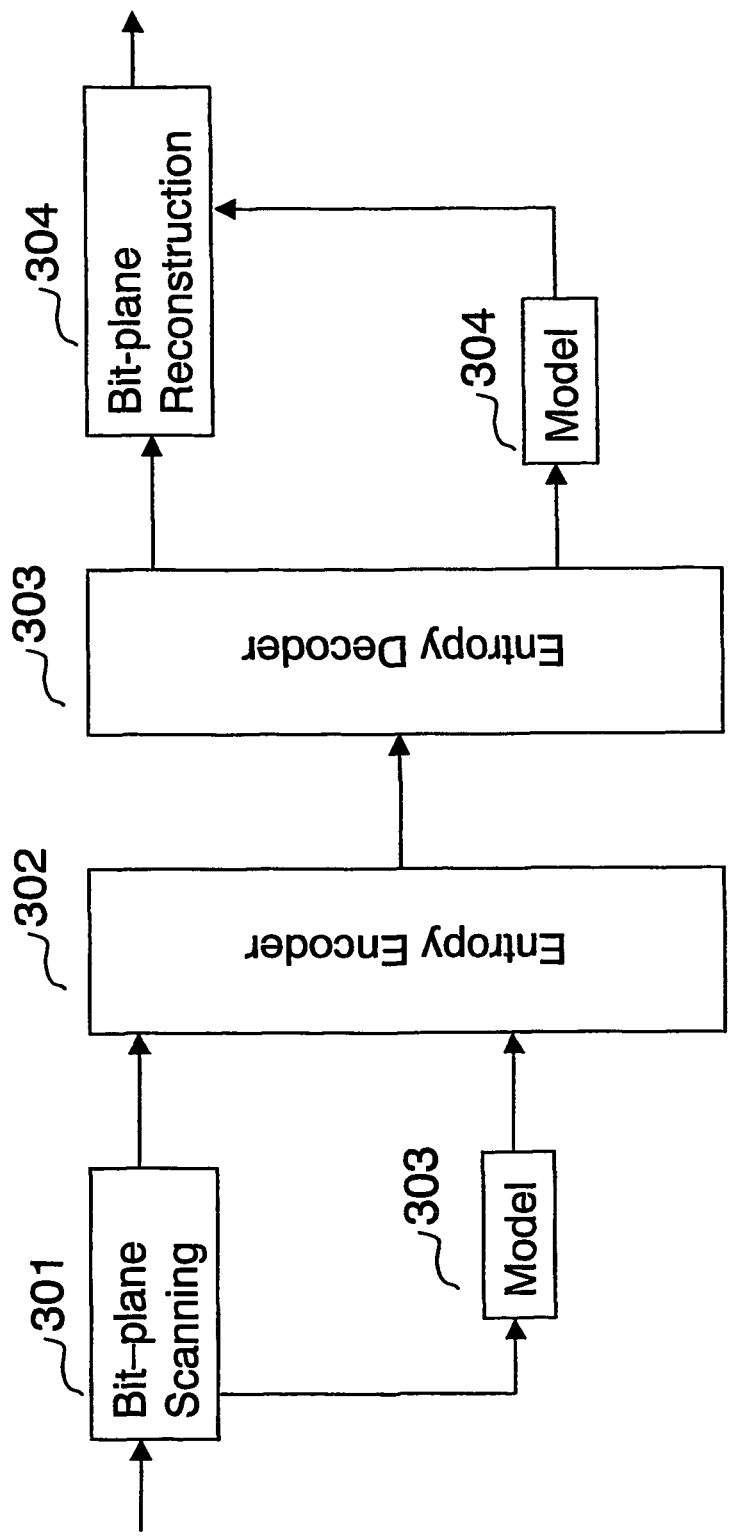
FIG. 3 illustrates a structure of a bit-plane coding process.

FIG. 3 illustrates a structure of the above bit-plane coding (BPC) process, where each input vector is first decomposed into the binary sign and amplitude symbols, which are then scanned, in a desired order, by a bit-plane scanning unit 301 and coded by an entropy coder 302 (e.g. as arithmetic code, as Huffman code or as run-length code). In addition, a statistical model 303, for example based on a Laplacian distribution of the input signal, is usually used to determine the probability assignment for each binary symbol to be coded. In the corresponding decoder, the data flaw is reversed, i.e. the output of the entropy encoder 302 is decoded by an entropy decoder 303 using a corresponding statistical model 304 and the result is used by a bit-plane reconstruction unit 304 to rebuild the bit-plane, where the sign and amplitude symbols which are decoded to rebuild the bit-plane of the data vector follows the same scanning order in the encoder.

The most significant advantage of having a bit-plane coding system as above is the resulted compression bit-stream can be easily truncated to any desirable rates, where a reproduction data vector x̂ can still be obtained by a partial reconstructed bit-planes decoded from this truncated bit-stream. For best coding performance, an embedded principle (see [24]) is usually adopted in BPC, according to which the bit-plane symbols are coded in the order of decreasing rate-distortion slope so that symbols with most signification contribution to the final distortion per unit rate are always coded first.

The selection of the order of bit-plane scanning depends on the desired distortion measurement. When the mean square error (MSE) or the expectation on the square error function is used as the distortion measurements as shown:

$$d(\underline{x}_n, \hat{\underline{x}}_n) = \frac{1}{n} \sum_{i=1}^{n} (x_i - \hat{x}_i)^2$$

wherein $d(\underline{x}_n, \hat{\underline{x}}_n)$ is the distortion value, $\underline{x}_n$ is the original data vector, and $\hat{\underline{x}}_n$ is the reconstructed vector of $\underline{x}_n$ at the decoder.

Results from [24] shows that the embedded principle is satisfied well by a sequential bit-plane scanning and coding procedure for most sources, except those with very skew bit-plane symbols distribution.

An example of a simple sequential bit-plane scanning and coding procedure comprises the following steps:
1. Starting from the most significant bit-plane j=M−1;
2. Encode only $b_{i,j}$ with $b_{i,M-1}=b_{i,M-2}=\ldots=b_{i,j+1}=0$. If $b_{i,j}=1$ in the significance scan, encode $s_i$; (significance pass);
3. Encode $b_{i,j}$ that are not be encoded in the significance pass (Refinement pass);
4. Progress to bit-plane j−1.
List 1. Bit-Plane Scanning & Coding Procedure The above procedure is iterated until certain terminating criterion, which is usually a pre-defined rate/distortion constraint, is reached. In addition, further adjustment of coding sequence in a significance pass may be required if bit-plane symbols are found to have unequal distributions.

An example of the above sequential coding procedure is illustrated by considering a data vector x with dimension 4, say {9,−7,14,2}. So it is bit-plane coded from its most significant bit-plane 4. The significance pass is begun with since all elements are insignificant yet. (X denotes the bypass symbols). The sign is coded as follows: positive is coded as 1, and negative is coded as 0.

| Data vector | 9 | −7 | 14 | 1 |
|---|---|---|---|---|
| 1st significant pass (sign) | 1(sign: 1) | 0 | 1(sign: 1) | 0 |
| 1st refinement pass | X | X | X | X |
| 2nd significant pass (sign) | X | 1(sign: 0) | X | 0 |
| 2nd refinement pass | 0 | X | 1 | X |
| 3rd significant pass | X | X | X | 0 |
| 3rd refinement pass | 0 | 1 | 1 | X |
| 4th significant pass | X | X | X | 1(sign: 1) |
| 4th refinement pass | 1 | 1 | 0 | X |

Thus the output binary stream is 110110100001001111110, which is then entropy coded and sent to the decoder. At the decoder, the bit-plane structure of the original data vector is reconstructed. If the entire binary stream is received by the decoder, the bit-plane of the original data vector can be restored and thus, a lossless reconstruction of the original data vector is obtained. If only a subset (most significant part) of the binary stream is received, the decoder still able to restore a partial bit-plane of the original data vector, so that a coarse reconstruction (quantized) version of the original data vector.

The above is only a simple example of bit-plane scanning and coding procedure. In practice, the significant pass can be further fractionized to explore the statistical correlation of elements in the data vector, such as the bit-plane coding process in JPEG2000, or that in the embedded audio coder (EAC) described in [4].

The above sequential bit-plane scanning and coding procedure only provides an effort to optimize the MSE performance. In area of audio, image or video coding, minimizing perceptual distortion instead of MSE is normally a more efficient coding method for obtaining optimal perceptual quality in reconstructed audio, image or video signal. Therefore, the sequential bit-plane coding of the error signal is definitely a sub-optimal option.

In the encoder 100, the error coefficients are preferably grouped into frequency bands so that each frequency band s contains a number of error coefficients in consecutive order. (The scale factor band grouping may be based on the band grouping adopted in the quantizer 102 if a perceptual coder is used as the quantizer 102. However other band grouping is also possible).

A frequency band s is said to be significant if there exist an error coefficient in the frequency band s such that the quantized coefficient thr(k) from the quantizer is not zero. In other words, if e(k) is an error coefficient in frequency band s:

$$e(k)=c(k)-thr(k),$$

frequency band s is significant is thr(k)≠0 (thr(k)=0 when i(k)=0), and hence e(k)=c(k), else frequency band s is considered insignificant.

Perceptual significance of bits of the error coefficients can be determined by the level of Just Noticeable Distortion (JND) at a frequency location i. This level of JND, $T_i$, can be determined from a perceptual model such as psychoacoustic model (I or II) or any proprietary perceptual models. When a perceptual quantizer is used for forming the core-layer bitstream, the perceptual model used in the quantizer may also be used to generate the JND for perceptual bit-plane coding of the error coefficients.

For simplicity, perceptual significance of bits of the error coefficients in a same frequency band s can be set to the same value.

In the following, a possible implementation of perceptual bit-plane coding is explained with reference to FIG. 4.

Figure 4:
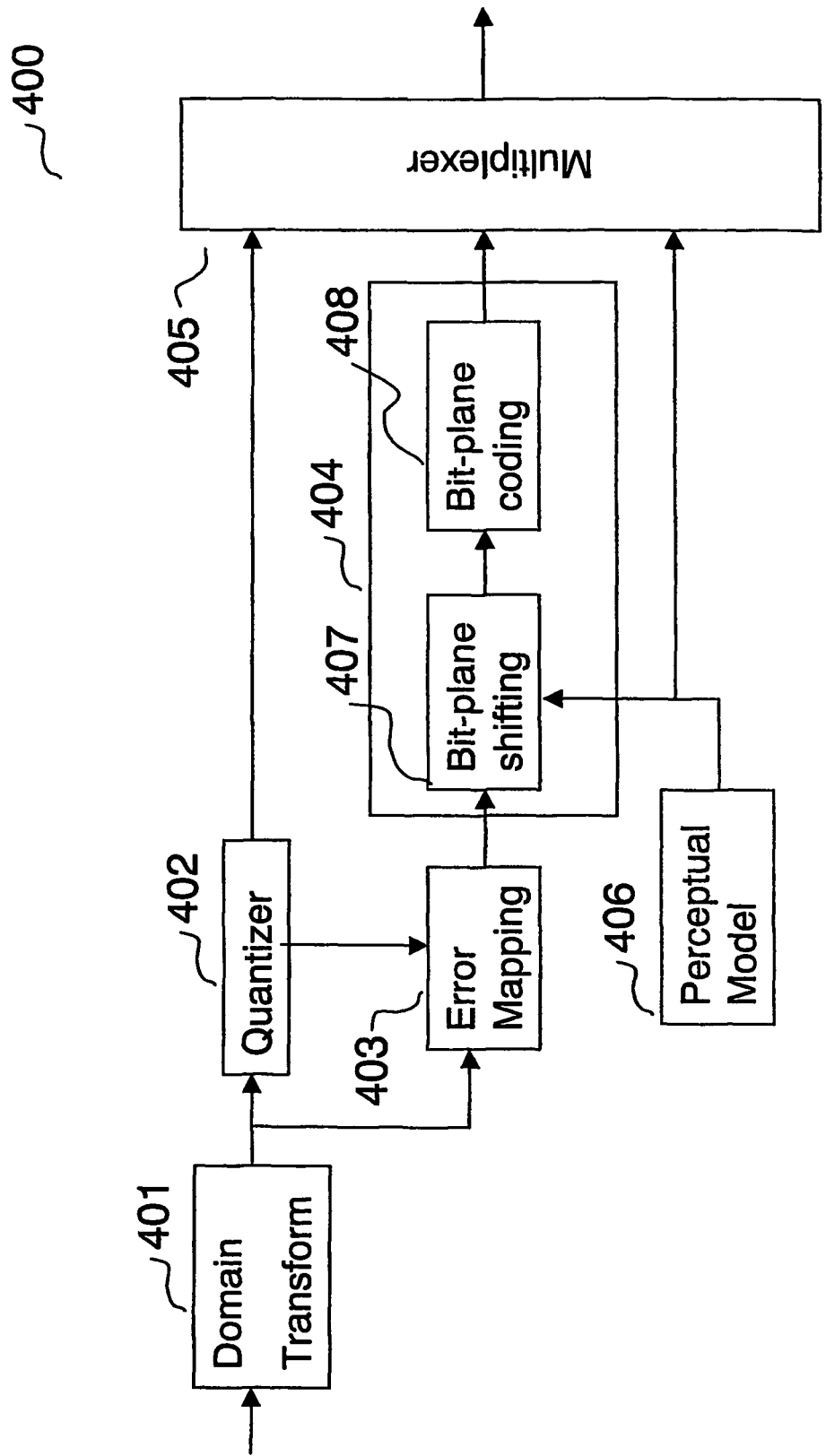
FIG. 4 shows an encoder according to an embodiment of the invention.

FIG. 4 shows an encoder 400 according to an embodiment of the invention.

Analogously to the encoder 100, the encoder 400 comprises a domain transformer 401, a quantizer 402, an error mapping unit 403, a perceptual bit-plane coder 404 (using a perceptual model 406) and a multiplexer 405.

The perceptual BPC block, i.e., the perceptual bit-plane coder 404 comprises a bit-plane shifting block 407 and a conventional BPC block 408.

In the bit-plane shifting block 407, the bit-planes are perceptually shifted, and the perceptually shifted bit-planes are coded in the BPC block 408 in a conventional sequential scanning and coding manner.

Consider the following (modified) perceptually weighted distortion measurement $$d(x_n, \hat{x}_n) = \frac{1}{n}\sum_{i=1}^{n}(x_i - \hat{x}_i)^2 w_i(x_i).$$

In the context of perceptual audio coding, the audio signal is usually quantized and coded in the frequency domain so that the data vector $x_n$ is the transformed audio signal and the weighting function $w_i(x_i)$ is the importance of $x_i$ at different frequency locations i, i.e., $$w_i(x_i) = \frac{1}{T_i}.$$

The above perceptually weighted distortion function may be re-written as follows:

$$d(x_n, x_n) = \frac{1}{n}\sum_{i=1}^{n}\frac{1}{T_i}(x_i - \hat{x}_i)^2 = \frac{1}{n}\sum_{i=1}^{n}\left(\frac{1}{\sqrt{T_i}}x_i - \frac{1}{\sqrt{T_i}}\hat{x}_i\right)^2$$

-continued $$= \frac{1}{n}\sum_{i=1}^{n}(x'_1 - \hat{x}'_i)^2,$$

where $$x'_i \stackrel{\Delta}{=} \frac{1}{\sqrt{T_i}} x_i, i = 1, \ldots, n.$$

Hence the weighting square error function now becomes a square error function on the scaled vector $x'_n = \{x'_1, \ldots, x'_n\}$. Therefore, perceptually optimized coding of $x_n$ can be achieved by simply performing sequential bit-plane coding on $x'_n$. In the corresponding decoder, each element of the bit-plane decoded data vector $\hat{x}'$ can be scaled back to obtain a reconstructed data vector $\hat{x}$ as follows.

$$\hat{x}_i = \sqrt{T_i} \cdot \hat{x}_i, i=1, \ldots, n.$$

Clearly, the weights $T_i$ are preferably transmitted to the decoder as side information if they are unknown in the decoder.

$w_j$ is further quantized to an even integer power of 2 so that it becomes $$\hat{T}_i = 2^{2\tau_i},$$

where $$\tau_i = \frac{1}{2}\log_2 T_i$$

and the scaled data vector can thus be obtained by bit-shifting each element in the original data vector as follows $$x'_i = 2^{-\tau_i} x_i.$$

which is easily obtained by performing right shifting operation on $x_i$ by $\tau_i$. For example, if $x_i=00010011$ and $\tau_i=-2$, the scaled data vector element $x'_i$ is then 01001100; if $\tau_i=2$ it will become 00000100.11.

In this way, the bit-planes of the error coefficients are perceptually shifted in a manner such that when a sequential bit-plane coding is performed on the shifted bit-plane, bits which are more perceptually significant (instead of having the highest MSE) can be encoded first.

Clearly, if each element in the original data vector is integer with limited word length, e.g., if each element in x has a maximum bit-plane of L, lossless coding of x can be achieved if every $x'_i$ in the scaled vector is bit-plane coded from bit-plane $-\tau_i \sim L-\tau_i$.

As mentioned earlier, information on the perceptual significance such as the level of JND can be provided to the bit-plane shifting block from a perceptual model.

In the bit-plane coding process, a maximum bit-plane, M(s), can be used to specify the starting bit-plane at which the bit-plane scanning and coding should start. The maximum bit-plane M(s) and $\tau_i$ should preferably be transmitted as side information in the scalable bitstream to the corresponding decoder in order for the decoder to be able to decode the bitstream correctly. To reduce the amount of side information, M(s) and $\tau_i$ may be constrained to the same value for the same scale factor band s in the encoder.

The value of the maximum bit-plane M(s) in each frequency band can be determined from the error coefficients e(k) using the following expression:

$$2^{M(s)-1} \leq \max(|e(k)|) < 2^{M(s)}, k \in s.$$

Furthermore, the maximum absolute value of the error coefficients $\max(|e(k)|)$ in each significant frequency band s are bounded by the quantizer interval of the perceptual quantizer:

$$\max(|e(k)|) \leq thr(i(k)+1) - thr(i(k)).$$

Therefore, this results in the maximum bit-plane M(s) for each significant frequency band s to be determined from the following expression:

$$2^{M(s)-1} \leq \max(|thr(i(k)+1) - |thr(i(k))||) < 2^{M(s)}, k \in s.$$

Since the quantized coefficients of the perceptual quantizer i(k) is known to the decoder, it is thus not necessary to transmit the maximum bit-plane M(s) as side information to the decoder for the significant frequency bands s.

The value of the maximum bit-plane M(s) may also be predefined in the encoder and decoder, and hence, need not be transmitted as the side information.

Figure 5:
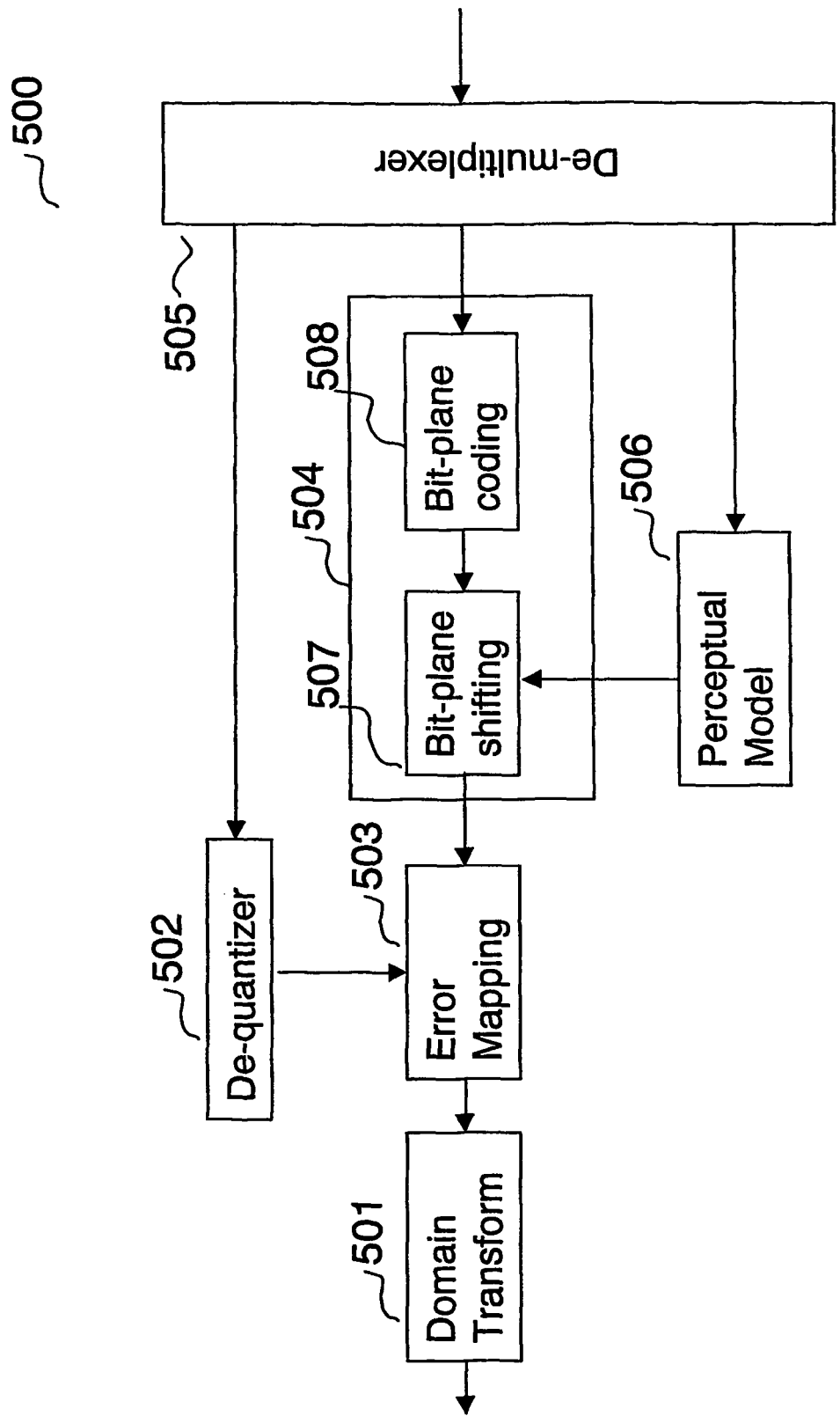
FIG. 5 shows a decoder according to an embodiment of the invention.

FIG. 5 shows a decoder 500 according to an embodiment of the invention.

The decoder 500 implements a perceptual bit-plane decoder which comprises bit-plane shifting and conventional (sequential) bit-plane coding.

Analogously to the decoder 200 the decoder 500 comprises a domain transformer 501, a de-quantizer 502, an error mapping unit 503, a perceptual bit-plane decoder 504 (using a perceptual model 506) and a de-multiplexer 505.

Similar to the perceptual bit-plane coder 404, the perceptual bit-plane decoder 504 comprises a bit-plane shifting block 507 and a conventional BPC block 508.

The enhancement-layer bitstream generated by the encoder 400 is bit-plane decoded by the decoder 500 in the consecutive sequential manner (same sequential bit-plane scanning procedure as the encoder 400) to reconstruct the bit-planes. The reconstructed bit-planes are shifted in the reverse manner of the encoder 400, based on the received or regenerated value $\tau_i$, to generate the decoded error coefficients e'(k) which describe the bit-plane decoded enhancement-layer bitstream.

Figure 6:
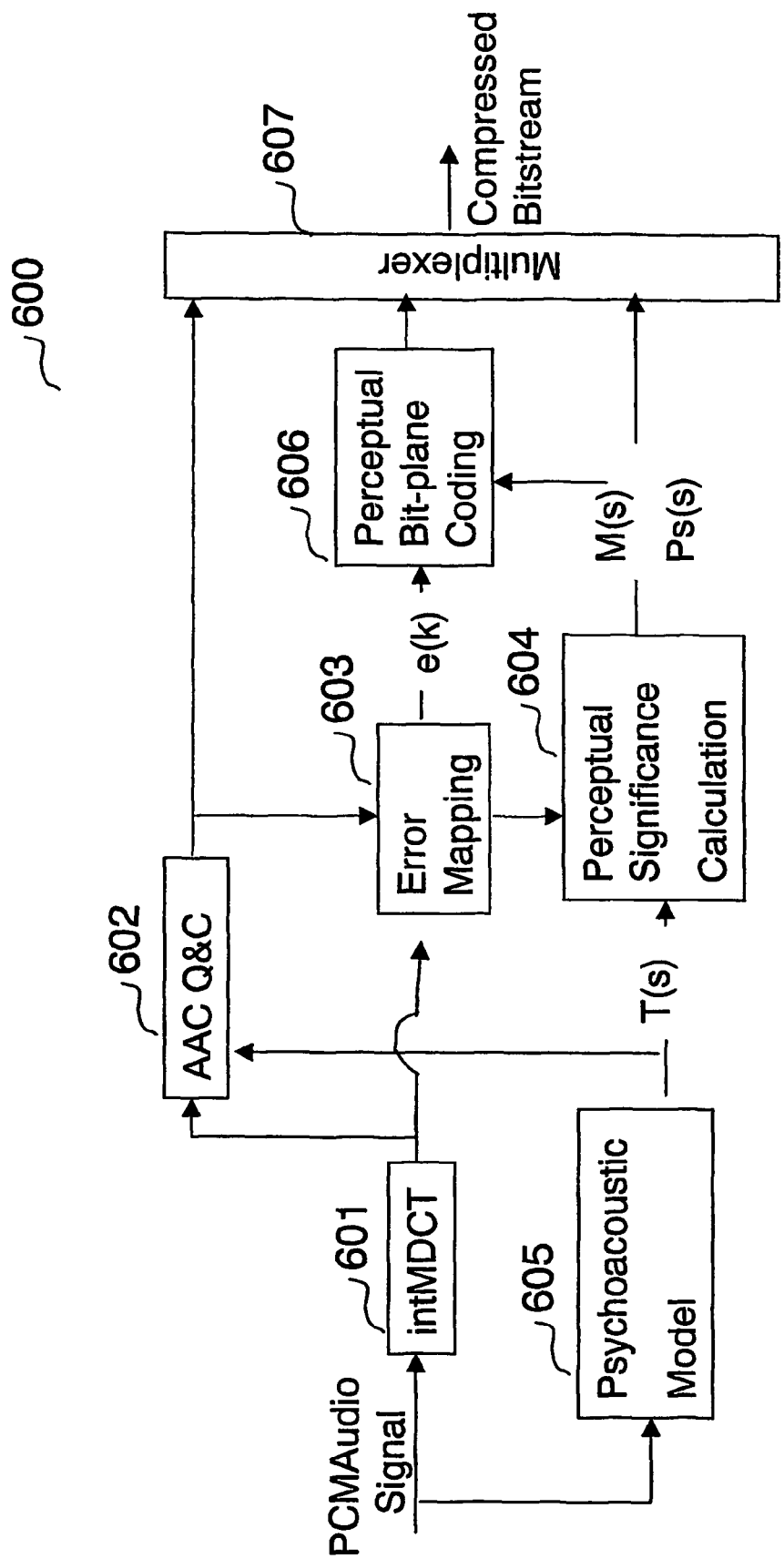
FIG. 6 shows an encoder according to an embodiment of the invention.

FIG. 6 shows an encoder 600 according to an embodiment of the invention.

The encoder 600 uses perceptual bit-plane coding.

The encoder 600 comprises a domain transformer (intMDCT) 601, a quantizer (ACC quantizer and coder) 602, an error mapping unit 603, a perceptual significance calculation unit 604 (using a psychoacoustic model 605), a perceptually bit-plane coding unit 606 and a multiplexer 607.

In this implementation, the scanning order of the bit-planes and the bit-plane symbols need not be sequential, but based on perceptual importance of the bit-plane symbols corresponding to different frequency bands. The perceptual importance of the bit-plane symbols is determined by calculating parameters related to the perceptual information, such as perceptual significance and first (maximum) bit-plane for bit-plane decoding. The calculation of the perceptual information parameters is represented as the perceptual significance calculation block, i.e., the perceptually bit-plane coding unit 604.

There are numerous ways to determine the perceptual importance, or specifically the perceptual significance, of the bit-plane symbols corresponding to different frequency bands. One widely adopted way is by using the psychoacoustics model, such as the Psychoacoustics Model 2 described in [19], of the input digital signal. The just noticeable distortion (JND) level T(s) for each frequency band determined using the psychoacoustic model can be converted to the unit of bit-plane level τ(s) as follows:

$$\tau(s) = \frac{1}{2}\log_2(T(s))$$

However, this invention does not constrain the method on how T(s) or τ(s) can be obtained.

Now let Ps(s) represent the perceptual significance of frequency band s, which can be determined by the distance from M(s) to τ(s) as, Ps(s)=M(s)−τ(s).

It can be further noted that the noise level, or the level of the IntMDCT error coefficients e(k) would tend to be flat with respect to the JND level for significant bands (as a result of the noise shaping mechanism in the core coder). In other words, the value of Ps(s) would be very close, if not identical, for significant frequency bands. This fact can be explored in the method according to the invention by sharing a common factor Ps_common for all the significant bands. Possible selections of Ps_common can be the average value, the maximum value, the minimum value, or any other reasonable function of Ps(s) for all s that are significant. The Ps(s) can then be normalized as follows:

Ps'(s)=Ps(s)−Ps_common,

Since it is known that for significant band s, Ps'(s) would be zero, and therefore, need not be transmitted to the decoder. Otherwise, for insignificant band s, Ps'(s) should preferably be transmitted to the corresponding decoder as side information.

In some other examples when there is no significant band, Ps_common can be set to 0.

It is also possible to use the noise shaping procedure in the core encoder to cater to the need for perceptual coding. Hence there is no need to further implement any noise shaping, or perceptual significant identification in the enhance layer. In such cases, Ps'(s)=0 can be set for all s. Usually they do not need to be transmitted to the decoder if it is known by the decoder that they are all zero.

A possible implementation of the perceptual bit-plane coding mechanism can be described using the following pseudo code. Here the total number of the frequency band is denoted as s_total.
1. Find frequency band s with largest Ps'(s)
2. Encode bit-plane symbols of bit-plane M(s) for e(k) in band s
3. M(s)=M(s)−1; Ps'(s)=Ps'(s)−1
4. if there exists band s for which M(s)≧0 goto 1.

A method for obtaining the maximum bit-plane M(s) is described here.

For significance band, M(s) can be determined from the maximum quantization interval of the quantizer if a perceptual quantizer such as an AAC quantizer is used. Specifically, M(s) is an integer that satisfies:

$2^{M(s)-1} \leq \max(|thr(i(k)+1)-|thr(i(k))||) < 2^{M(s)}, k \in s$.

In this case, M(s) does not need to be transmitted to the decoder as i(k) would be known to the decoder.

For insignificant bands M(s) can be calculated from e(k) as follows:

$2^{M(s)-1} \leq \max(|e(k)|) < 2^{M(s)}, k \in s$, and for those bands, M(s) should preferably be sent to the decoder as side information such an information is not contained in the core-layer bit-stream.

The value of the maximum bit-plane M(s) may also be predefined in the encoder 600 and the corresponding decoder, and hence, need not be transmitted as the side information.

Other alternative approaches to explore parameter Ps(s) in a bit-plane coding approach, towards some desired noise shaping goals, are also possible. In general, Ps(s) can also be obtained by any functions of M(s) and τ(s), for example the following:

$$Ps(s) = M(s) - 2\tau(s), \text{ or}$$
$$Ps(s) = \frac{M(s) - \tau(s)}{2}.$$

Figure 7:
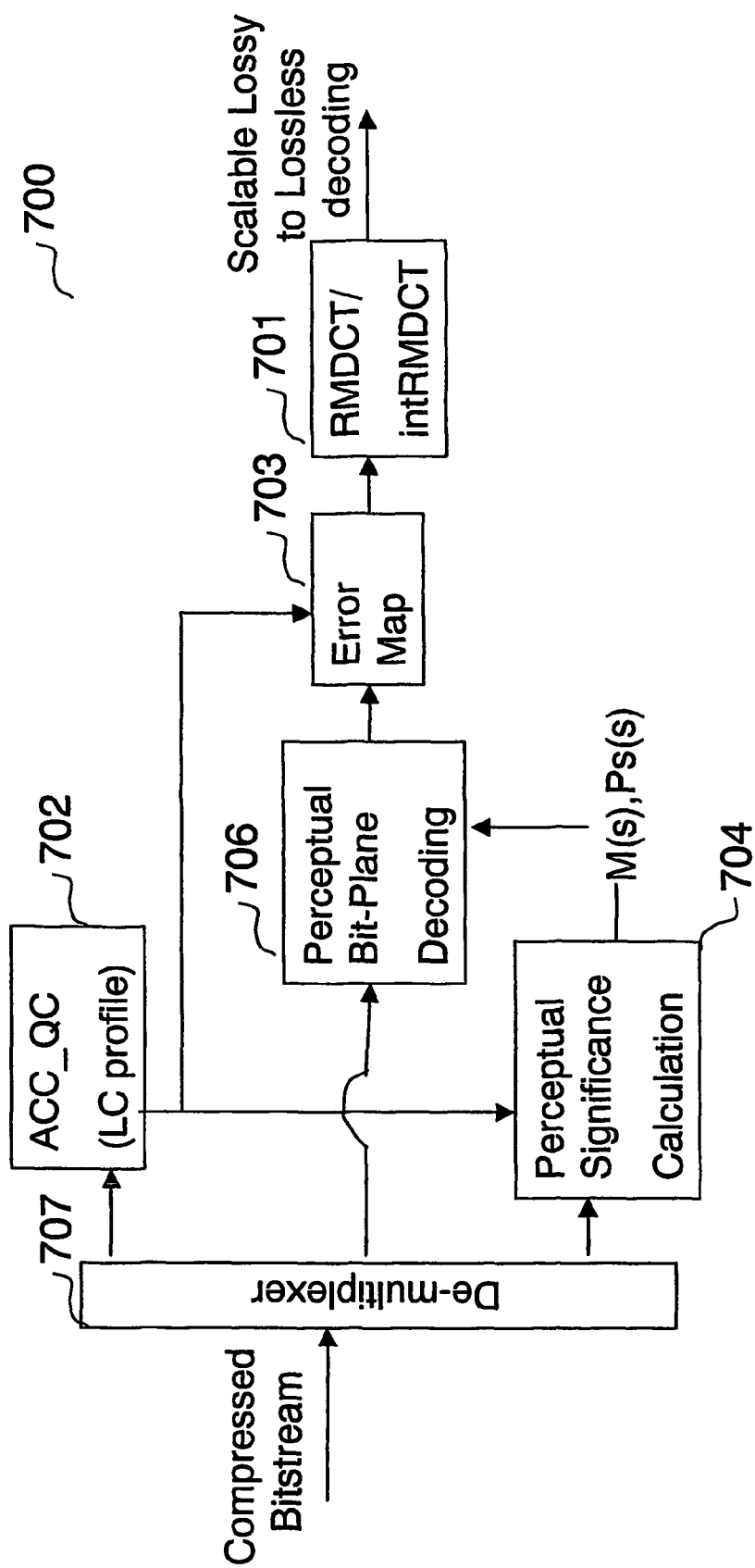
FIG. 7 shows a decoder according to an embodiment of the invention.

FIG. 7 shows a decoder 700 according to an embodiment of the invention.

The decoder 700 is the corresponding decoder of the coder 600, wherein the perceptual bit-plane decoding is implemented using the perceptual bit-plane scanning procedure as described above.

The decoder 700 accordingly comprises a domain transformer (reverse intMDCT) 701, a de-quantizer (ACC de-quantizer and decoder) 702, an error mapping unit 703, a perceptual significance calculation unit 704, a perceptually bit-plane decoding unit 706 and a de-multiplexer 707.

In the decoder 700, for significant band, Ps'(s) is set to zero, and M(s) can be calculated from the AAC quantization index i(k) in the same manner in the encoder, i.e.:

$2^{M(s)-1} \leq \max(|thr(i(k)+1)-|thr(i(k))||) < 2^{M(s)}, k \in s$.

For insignificant band, Ps(s) and M(s) can simply be recovered from the transmitted side information. Once Ps(s) and M(s) is recovered for all frequency bands, the IntMDCT error coefficients ê(k) can be easily reconstructed by decoding the received bit-stream and reconstruct its bit-plane symbols in a order that is exact the same as that in the encoder 700. For example, the decoding process for the encoding example given above would be:
1. Find frequency band s with largest Ps'(s)
2. Decode bit-plane symbols of bit-plane M(s) for ê(k) in band
3. M(s)=M(s)−1; Ps'(s)=Ps'(s)−1
4. If there exists band s for which M(s)≧0 goto 1.

Determining the maximum bit-plane for bit plane coding of error coefficients.

For a significant band s (i.e., the error coefficient e(k)≠ĉ(k) or ∃k∈s, i(k)≠0), the maximum absolute value of e(k) is bounded by the quantizer interval in the AAC quantizer as:

$\max(|e(k)|) \leq thr(i(k)+1)-thr(i(k))$.

Therefore, the maximum bit-plane M(k) can be determined using:

$2^{M(k)-1} \leq \max(|thr(i(k)+i)-|thr(i(k))||) < 2^{M(k)}, k \in s$.

As i(k) is already known by the decoder, M(k) need not be transmitted to the decoder since the decoder is able to regenerate thr(k) and hence, M(k) from i(k) for significant band s.

For insignificant band, M(k) can be calculated from e(k) as follows:

$2^{M(s)-1} \leq \max(|e(k)|) < 2^{M(s)}, k \in s$, and the calculated M(s) is preferably transmitted with the enhancement-layer bitstream as side information for the enhancement-layer bitstream to be bit-plane decoded correctly.

To reduce the amount of side information, M(k) can be further constrained to have the same values for k for the same scale factor band s in the core-layer quantizer. Therefore, M(k) may be denoted also as M(s).

In the decoder 700, the error coefficients corresponding to the error signal can be reconstructed by bit-plane decoding of the enhancement-layer bitstream using the same bit-plane scanning procedure as the encoder based on M(s). For significant band, M(s) can be regenerated using the following:

$$2^{M(k)-1} \leq \max(|thr(i(k)+1) - |thr(i(k))||) < 2^{M(k)}, k \in s.$$

For insignificant band, the decoder makes use of the M(s) which is transmitted by the encoder as side information.

REFERENCES

[1] M. Bosi and et al, "ISO/IEC Mpeg-2 Advanced Audio Coding", J. Audio Eng. Soc., Vol. 45, No. 10, pp. 789-814, 1997 October.
[2] Jr. Stuart and et. al., "MLP lossless compression," AES $9^{th}$ Regional Convention Tokyo.
[3] R. Geiger, J. Herre, J. Koller, and K. Brandenburg, "INT-MDCT—A link between perceptual and lossless audio coding," IEEE Proc. ICASSP 2002.
[4] J. Li, "Embedded audio coding (EAC) with implicit auditory masking", ACM Multimedia 2002, Nice, France, December 2002
[5] T. Moriya, N. Iwakami, T. Mori, and A. Jin, "A design of lossy and lossless scalable audio coding," IEEE Proc. ICASSP 2000.
[6] T. Moriya and et. al., "Lossless Scalable Audio Coder and Quality Enhancement," Proceeding of ICASSP 2002.
[7] M. Hans and R. W. Schafer, "Lossless Compression of Digital Audio," IEEE Signal processing magazine. Vol. 18 No. 4, pp. 21-32, 2001.
[8] Lin Xiao, Li Gang, Li Zhengguo, Chia Thien King, Yoh Ai Ling, "A Novel Prediction Scheme for Lossless Compression of Audio Waveform", Proc. IEEE ICME2001, Aug. Japan.
[9] Shorten: http://www.softsound.com/Shorten.html
[10] WaveZip: http://www.gadgetlabs.com/wavezip.html
[11] LPAC: http://www-ft.ee.tu-berlin.de/~liebchen/
[12] Wave Archiver: www.ecf.utoronto.ca/~denlee/wavarc.html
[13] R. Geiger, T. Sporer, J. Koller, and K. Brandenburg, "Audio Coding based on Integer Transforms," $111^{th}$ AES Convention, September 2001.
[14] J. Johnston, "Estimation of Perceptual Entropy," Proc. ICASSP 1988.
[15] R. Yu, C. C. Ko, X. Lin and S. Rahardja, "Bit-plane Golomb code for sources with Laplacian distributions," proceeding of ICASSP 2003.
[16] Monkey's Audio, http://www.monkeysaudio.com
[17] S. H. Park et al., "Multi-Layer Bit-Sliced Bit Rate Scalable MPEG-4 Audio Coder", presented at the 103th Convention of the AES, New York, September 1997(preprint 4520)
[18] Ralf Geiger and et. al., "FINE GRAIN SCALABLE PERCEPTUAL AND LOSSLESS AUDIO CODING BASED ON INTMDCT," Proceeding of ICASSP2003.
[19] ISO/IEC 14496-3 Subpart 4, Information Technology—Coding of Audiovisual Objects, Part 3. Audio, Subpart 4 Time/Frequency Coding, ISO/JTC 1/SC 29/WG11, 1998
[20] T. Painter, A. Spanias, "Perceptual Coding of Digital Audio", IEEE Proceedings, vol. 88, no. 4, April 2000.
[21] ISO/IEC 11172-3, "CODING OF MOVING PICTURES AND ASSOCIATED AUDIO FOR DIGITAL STORAGE MEDIA AT UP TO ABOUT 1.5 MBIT/s, Part 3 AUDIO
[22] Westen, S. J. P., R. L. Lagendijk, and J. Biemond, "Optimization of JPEG color image coding using a human visual system model", SPIE conference on Human Vision and Electronic Imaging
[23] Westen, S. J. P., R. L. Lagendijk, and J. Biemond, "Spatio-Temporal Model of Human Vision For Digital Video Compression," SPIE Proceeding of Electronic Imaging 97.
[24] J. Li and S. Lie, "An embedded still image coder with rate-distortion optimization," IEEE Trans. On Image Processing, vol. 8, no. 7, pp. 913-924, July 1999

What is claimed:

1. A method for encoding a digital signal into a scalable bitstream comprising:
   quantizing the digital signal, and encoding the quantized signal to form a core-layer bitstream;
   performing an error mapping based on the digital signal and the core-layer bitstream to remove information that has been encoded into the core-layer bitstream, resulting in an error signal;
   bitplane coding the error signal based on perceptual information of the digital signal, resulting in an enhancement-layer bitstream, wherein the perceptual information of the digital signal is determined using a perceptual model;
   multiplexing the core-layer bitstream and the enhancement-layer bitstream, thereby generating the scalable bitstream;
   wherein the error signal is represented in bitplanes comprising a plurality of bitplane symbols, and wherein the bitplanes are shifted based on the perceptual information of the digital signal, such that bitplanes which are more perceptually important are coded first when the bitplanes are scanned and coded in a consecutive sequence during bitplane coding of the error signal;
   wherein at least one of the following information is determined as the perceptual information of the digital signal by the perceptual model; and
   for each frequency band s of a plurality of frequency bands, the maximum bit-plane M(s) that contains a non-zero bit-plane symbol for the frequency band s of the error signal.

2. The method of claim 1, further comprising:
   transforming the digital signal into a suitable domain, wherein the transformed signal is quantized to form the quantized signal before encoding the quantized signal.

3. The method of claim 1 wherein the perceptual information of the digital signal is further multiplexed with the core-layer bitstream and the enhancement-layer bitstream to generate the scalable bitstream.

4. The method of claim 2, wherein the digital signal is transformed to a transformed digital signal using an integer Modified Discrete Cosine Transform.

5. The method of claim 4, wherein the transformed signal is normalized to approximate the output of a MDCT filterbank.

6. The method of claim 1 wherein the digital signal or the transformed digital signal is quantized and encoded according to the Moving Pictures Expert Group (MPEG) Advanced Audio Coding (AAC) specification.

7. The method of claim 1 wherein the error mapping is performed by subtracting the lower quantization threshold corresponding to each quantized value of the quantized signal from the digital signal or the transformed digital signal, thereby generating the error signal.

8. The method of claim 1 wherein the psychoacoustic model is used as the perceptual model for determining the perceptual information of the digital signal.

9. The method of claim 1 wherein at least the following information is determined as the perceptual information of the digital signal by the perceptual model:
the Just Noticeable Distortion (JND) level of the digital signal, wherein s correspond to a frequency band of the digital signal or the transformed digital signal.

10. The method of claim 9, wherein perceptual significance Ps(s) of the digital signal is further determined as the perceptual information, the perceptual significance is determined by:
determining the bitplane of the error signal corresponding to the JND level of the digital signal,
subtracting the bitplane of the error signal corresponding to the JND level of the digital signal from the bitplane of the error signal which the bitplane coding of the error signal starts M(s), thereby determining the perceptual significance Ps(s), wherein the perceptual significance Ps(s) is used to control the scanning and coding sequence of at least the bitplanes or the bitplane symbols of the bitplanes.

11. The method of claim 10, wherein the perceptual significance Ps(s) is normalized by:
defining a common perceptual significance Ps(s)_common based on a function of the perceptual significance Ps(s); and
subtracting the common perceptual significance Ps(s)_common from the perceptual significance Ps(s), thereby generating the normalized perceptual significance Ps'(s),
wherein for frequency band s for which the quantized values are not all zero, the value of the perceptual significance Ps(s) is set to the value of the common perceptual significance Ps_common, and
wherein for frequency band s for which the quantized values are all zero, the normalized perceptual significance Ps'(s) is multiplexed with the core layer bitstream and the enhancement layer bitstream to generate the scalable bitstream.

12. The method of claim 9, wherein the bitplane of the error signal which the bitplane coding of the error signal starts is determined from the quantization step size used in the frequency band s for quantizing the digital signal or the transformed signal.

13. The method of claim 1, wherein at least one of the following information is determined as the perceptual information of the digital signal by the perceptual model:
the bit-plane of the error signal which the bit-plane coding of the error signal starts M(s); and
the Just Noticeable Distortion (JND) level of the digital signal, wherein s correspond to a frequency band of the digital signal or the transformed digital signal.

14. A encoder for encoding a digital signal into a scalable bitstream, comprising:
a quantization unit for quantizing the digital signal, and encoding the quantized signal to form a core-layer bitstream;
an error mapping unit for performing an error mapping based on the digital signal and the core-layer bitstream to remove information that has been encoded into the core-layer bitstream, resulting in an error signal;
a perceptual bitplane coding unit for bitplane coding the error signal based on perceptual information of the digital signal, resulting in an enhancement-layer bitstream,
wherein the perceptual information of the digital signal is determined using a perceptual model;
a multiplexing unit for multiplexing the core layer bitstream and the enhancement layer bitstream, thereby generating the scalable bitstream;
wherein the error signal is represented in bitplanes comprising a plurality of bitplane symbols, and wherein the bitplanes are shifted based on the perceptual information of the digital signal, such that bitplanes which are more perceptually important are coded first when the bitplanes are scanned and coded in a consecutive sequence during bitplane coding of the error signal;
wherein at least one of the following information is determined as the perceptual information of the digital signal by the perceptual model; and
for each frequency band s of a plurality of frequency bands, the maximum bit-plane M(s) that contains a non-zero bit-plane symbol for the frequency band s of the error signal.

15. A non-transitory computer readable medium, having a program recorded thereon, wherein the program, when executed by a computer, makes the computer perform a procedure for encoding a digital signal into a scalable bitstream, the procedure comprising:
quantizing the digital signal, and encoding the quantized signal to form a core layer bitstream;
performing an error mapping based on the digital signal and the core layer bitstream to remove information that has been encoded into the core layer bitstream, resulting in an error signal;
bitplane coding the error signal based on perceptual information of the digital signal, resulting in an enhancement layer bitstream, wherein the perceptual information of the digital signal is determined using a perceptual model;
multiplexing the core layer bitstream and the enhancement layer bitstream, thereby generating the scalable bitstream;
wherein the error signal is represented in bitplanes comprising a plurality of bitplane symbols, and wherein the bitplanes are shifted based on the perceptual information of the digital signal, such that bitplanes which are more perceptually important are coded first when the bitplanes are scanned and coded in a consecutive sequence during bitplane coding of the error signal;
wherein at least one of the following information is determined as the perceptual information of the digital signal by the perceptual model; and
for each frequency band s of a plurality of frequency bands, the maximum bit-plane M(s) that contains a non-zero bit-plane symbol for the frequency band s of the error signal.

16. A method for decoding a scalable bitstream into a digital signal comprising:
demultiplexing the scalable bitstream into a core layer bitstream and an enhancement layer bitstream;
decoding and dequantizing the core layer bitstream to generate a core layer signal;
bitplane decoding the enhancement layer bitstream based on perceptual information of the digital signal;
performing an error mapping based on the bitplane decoded enhancement layer bitstream and the dequantized core layer signal, resulting in a reconstructed transformed signal, wherein the reconstructed transformed signal is the digital signal;
wherein the enhancement-layer bitstream is bit-plane decoded to generate a plurality of bit-planes comprising a plurality of bit-plane symbols in a consecutive sequence, and the bit-planes are shifted based on the perceptual information of the digital signal to generate the bit-plane decoded enhancement-layer bitstream;

wherein at least the following information is received as the perceptual information of the digital signal; and for each frequency band s of a plurality of frequency bands, the maximum bit-plane M(s) that contains a non-zero bit-plane symbol for the frequency band s of the error signal.

17. The method of claim 16, further transforming the reconstructed transformed signal into a reconstructed signal, wherein the reconstructed signal is the digital signal.

18. The method of claim 16 wherein the perceptual information of the digital signal is obtained from the demultiplexing of the scalable bitstream.

19. The method of claim 17 wherein the core layer signal and the enhancement layer signal are transformed using an integer Modified Discrete Cosine Transform (MDCT).

20. The method of claim 16 wherein the core layer bitstream is decoded and dequantized according to the Moving Pictures Expert Group (MPEG) Advanced Audio Coding (AAC) specification.

21. The method of claim 16 wherein the error mapping is performed by adding the lower quantization threshold used for dequantizing the transformed signal and the bitplane decoded enhancement layer bitstream, thereby generating the enhancement layer signal.

22. The method of claim 16 wherein at least the following information is received as the perceptual information of the digital signal:

the Just Noticeable Distortion (JND) level of the digital signal, wherein s correspond to a frequency band of the digital signal.

23. The method of claim 22, wherein the bitplane which corresponds to the enhancement-layer bitstream when the bitplane decoding of the enhancement-layer bitstream starts M(s) is determined from the quantization step size used in the frequency band s for dequantizing the core-layer bitstream.

24. The method of claim 16, wherein at least one of the following information is received as the perceptual information of the digital signal:

the bit-plane which corresponds to the enhancement-layer bitstream when the bit-plane decoding of the enhancement-layer bitstream starts, which bit-plane is specified by a number M(s); and the Just Noticeable Distortion (JND) level of the digital signal, wherein s correspond to a frequency band of the digital signal.

25. A decoder for decoding a scalable bitstream into a digital signal comprising:

a demultiplexing unit for demultiplexing the scalable bitstream into a corelayer bitstream and an enhancement layer bitstream;

a dequantization unit for decoding and dequantizing the corelayer bitstream to generate a corelayer signal;

a bitplane decoding unit for bitplane decoding the enhancement layer bitstream based on perceptual information of the digital signal;

an error mapping unit for performing an error mapping based on the bitplane decoded enhancement layer bitstream and the dequantized corelayer signal, resulting in a reconstructed transformed signal, wherein the reconstructed transformed signal is the digital signal;

wherein the enhancement-layer bitstream is bit-plane decoded to generate a plurality of bit-planes comprising a plurality of bit-plane symbols in a consecutive sequence, and the bit-planes are shifted based on the perceptual information of the digital signal to generate the bit-plane decoded enhancement-layer bitstream;

wherein at least the following information is received as the perceptual information of the digital signal; and for each frequency band s of a plurality of frequency bands, the maximum bit-plane M(s) that contains a non-zero bit-plane symbol for the frequency band s of the error signal.

26. A non-transitory computer readable medium, having a program recorded thereon, wherein the program, when executed by a computer, makes the computer perform a procedure for decoding a scalable bitstream into a digital signal, the procedure comprising:

demultiplexing the scalable bitstream into a corelayer bitstream and an enhancement layer bitstream;

decoding and dequantizing the corelayer bitstream to generate a corelayer signal;

bitplane decoding the enhancement layer bitstream based on perceptual information of the digital signal;

performing an error mapping based on the bitplane decoded enhancement layer bitstream and the dequantized corelayer signal, resulting in a reconstructed transformed signal, wherein the reconstructed transformed signal is the digital signal;

wherein the enhancement-layer bitstream is bit-plane decoded to generate a plurality of bit-planes comprising a plurality of bit-plane symbols in a consecutive sequence, and the bit-planes are shifted based on the perceptual information of the digital signal to generate the bit-plane decoded enhancement-layer bitstream;

wherein at least the following information is received as the perceptual information of the digital signal; and for each frequency band s of a plurality of frequency bands, the maximum bit-plane M(s) that contains a non-zero bit-plane symbol for the frequency band s of the error signal.

27. A method for encoding a digital signal into a scalable bitstream comprising:

quantizing the digital signal, and encoding the quantized signal to form a core-layer bitstream;

performing an error mapping based on the digital signal and the core-layer bitstream to remove information that has been encoded into the core-layer bitstream, resulting in an error signal;

bit-plane coding the error signal based on perceptual information of the digital signal, resulting in an enhancement-layer bitstream, wherein the perceptual information of the digital signal is determined using a perceptual model;

multiplexing the core-layer bitstream and the enhancement-layer bitstream, thereby generating the scalable bitstream;

wherein the error signal is represented in bit-planes comprising a plurality of bit-plane symbols, and wherein the bit-planes and the bit-plane symbols are scanned and coded during bit-plane coding of the error signal in a sequence based on the perceptual information of the digital signal, such that bit-plane symbols of the bit-planes which are more perceptually important are coded first;

wherein at least the following information is determined as the perceptual information of the digital signal by the perceptual model; and for each frequency band s of a plurality of frequency bands, the maximum bit-plane M(s) that contains a non-zero bit-plane symbol for the frequency band s of the error signal.

28. A method for decoding a scalable bitstream into a digital signal comprising:
- de-multiplexing the scalable bitstream into a core-layer bitstream and an enhancement-layer bitstream;
- decoding and de-quantizing the core-layer bitstream to generate a core-layer signal;
- bit-plane decoding the enhancement-layer bitstream based on perceptual information of the digital signal; and
- performing an error mapping based on the bit-plane decoded enhancement-layer bitstream and the de-quantized core-layer signal, resulting in a reconstructed transformed signal, wherein the reconstructed transformed signal is the digital signal;
- wherein the enhancement-layer bitstream is bit-plane decoded to generate a plurality of bit-planes comprising a plurality of bit-plane symbols in a sequence based on the perceptual information of the digital signal, thereby generating the bit-plane decoded enhancement-layer bitstream;
- wherein at least the following information is received as the perceptual information of the digital signal:
- for each frequency band s of a plurality of frequency bands, the maximum bit-plane M(s) that contains a non-zero bit-plane symbol for the frequency band s of the error signal.

\* \* \* \* \*